United States Patent [19]

Blomquist et al.

[11] 4,208,590
[45] Jun. 17, 1980

[54] JET ELECTRIC GENERATOR

[76] Inventors: Cecil R. Blomquist, 3014 N. 34th St., Tacoma, Wash. 98407; Rodney L. O'Hiser, P.O. Box 807, Portland, Oreg. 97207

[21] Appl. No.: 942,316

[22] Filed: Sep. 14, 1978

Related U.S. Application Data

[63] Continuation-in-part of Ser. No. 866,569, Jan. 6, 1978, abandoned.

[51] Int. Cl.² .......................... H02P 9/04; F02C 3/14
[52] U.S. Cl. ..................................... 290/1 R; 60/39.35
[58] Field of Search ...................... 290/1, 52; 60/39.35

[56] References Cited

U.S. PATENT DOCUMENTS

2,709,895  6/1955  Mount ................................. 60/39.35

Primary Examiner—Gene Z. Rubinson
Assistant Examiner—John W. Redman
Attorney, Agent, or Firm—Christensen, O'Connor, Johnson & Kindness

[57] ABSTRACT

Apparatus for generating electrical energy is disclosed wherein an annular arrangement of rotor windings is affixed to a number of rotatable blades which radiate outwardly from a central rotatable hub. An annular stationary assembly of stator windings is coaxially positioned adjacent the rotor. Jet engines, mounted at or near the outer terminus of the blades, cause the blades and rotor to rotate about the hub and induce alternating current electrical energy into the stator windings. Some arrangements of the disclosed electrical generating apparatus include a second electrical generator wherein the stator thereof is affixed to a stationary wall that coaxially surrounds the path followed by the rotating blades. A second annular rotor assembly, including wind vanes that are subjected to airflow caused by the jet engines and rotation of the blades, is slidably mounted to the upper end of the stationary wall. As the jet engines propel the blades, the resulting airflow impinges on the wind vanes causing the second rotor to rotate and induce electrical current within the stator windings of the second electrical generator.

12 Claims, 9 Drawing Figures fig.1 fig.2 fig.3 fig.4 fig. 5 fig. 6

JET ELECTRIC GENERATOR

RELATED APPLICATIONS

This application is a continuation-in-part of application Ser. No. 866,569, filed Jan. 6, 1978 and entitled JET ELECTRIC GENERATOR now abandoned.

BACKGROUND OF THE INVENTION

This invention relates to apparatus for generating electrical energy and in particular to a generator in which the rotor is propelled by jet engines on blades to which the rotor is attached.

Electrical generators generally are field-type alternators having a fixed-position stator and a rotating field structure or rotor. The rotor generally is driven by a gas, stream, or hydraulic turbine.

A general object of the present invention is to provide an electrical generator which is powered by jet propulsion engines at or near the ends of blades to which the rotor portion of the generator is attached.

Another object of this invention is to provide a generator of the above-mentioned type in which the blades have ailerons for controlling the attitude of the blades as they are rotated by the jet engines.

A further object of the invention is to provide control means for defining upper and lower limit positions for the blades during operation so that should they sag they would be supported, and should they tend to lift during rotation such lift would be constrained to an upper limit position.

A still further object of the present invention is to provide an electrical generator driven by jet propulsion engines which have thrust enhancement means operable to volatize a quantity of liquid through the use of waste engine heat, which in turn produces gases that provide additional thrust.

Even further, it is an object of this invention to provide an electrical generator of the above-mentioned type wherein the rotor of a second electrical generator is driven by the airflow produced by the jet engines and rotation of the blades on which the engines are mounted.

SUMMARY OF THE INVENTION

These and other objects are achieved in accordance with this invention by a generator which employs a fixed position, annular stator that is mounted concentrically with an annular, rotating rotor. The rotor is attached to horizontally rotating blades which extend outwardly from a central rotatable hub and are rotationally propelled by jet propulsion engines that are mounted at or near the outer terminus of the rotating blades. The attitude of each blade is controlled by an aileron and maintained between predetermined lower and upper limit positions that are defined by rollers which bear against the upper and lower surfaces of an annular track having an I-beam cross-sectional geometry. In some embodiments of the invention, the thrust of the propulsion engines is improved by thrust enhancers that capture a portion of the engine's waste heat to volatize a liquid and expel the resultant gas substantially in the direction of engine thrust.

In other embodiments of the invention, a second electrical generator is included wherein an annular stator is affixed to a circular foundation wall which extends vertically upward and surrounds the outer ends of the rotating blades. In these embodiments of the invention, a plurality of circumferentially spaced apart wind vanes extend upwardly from a ring member that is slidably mounted in a groove within the upper face of the foundation wall. The rotor of the second generator is annular in geometry and is mounted to the wind vanes and ring member so as to be in spaced apart juxtaposition with one face of the stator. As the jet engines propel the blades about the rotational hub, the resulting airflow causes the wind vanes and attached rotor to rotate in a direction opposite to the rotation of the blades to thereby produce an alternating current in the stationary stator of the second generator.

BRIEF DESCRIPTION OF THE DRAWINGS

These and other objects and features of the present invention will become more apparent as the following description is read with the accompanying drawing in which.

DETAILED DESCRIPTION

Figure 1:
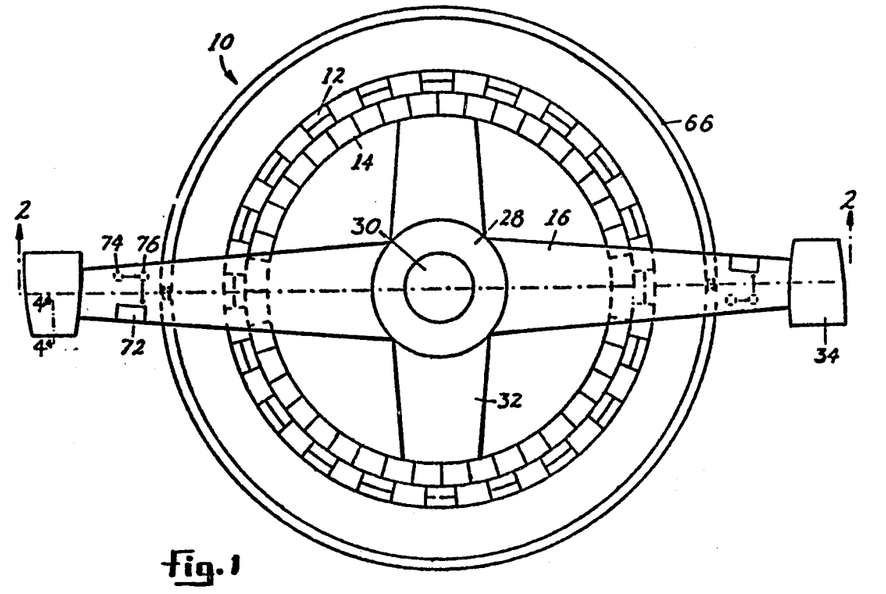
FIG. 1 is a diagrammatic plan view of a generator constructed in accordance with this invention.
Figure 2:
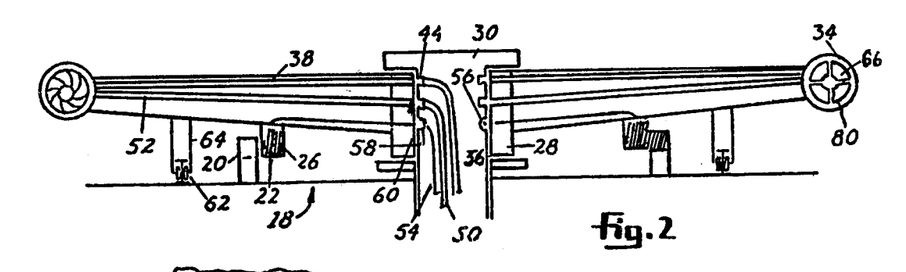
FIG. 2 is a cross-sectional view of the generator of FIG. 1, taken along the line 2—2.

Referring now to FIGS. 1 and 2, the jet electric generator 10 of this invention generally comprises a fixed position stator 12 concentrically arranged with a rotor 14. The rotor 14 is attached to a pair of rotatable blades 16 so that one face of the rotor 14 is in spaced apart juxtaposition with one face of the stator 12. Rotation of the blades 16 turns the rotor 14 within the stator 12 and induces alternating current electrical energy in the stator 12.

Rotor 14 is configured in the same manner as a conventional generator rotor, preferably being configured as a salient-type rotor, having a plurality of individually mounted field poles 22 each mounted on an annular core 26. Further, the stator 12 is constructed in the same manner as a conventional generator stator and is mounted on a support surface 18 such as a concrete slab or other type of foundation. Further, the stator 12 includes a plurality of windings or coils 20 that are arranged adjacent to the field poles 22 of the rotor 14.

Blades 16 are attached at their inner ends to a rotatable hub 28, which hub is mounted for rotation about a support shaft 30 that is located at the center of the electrical generator 10 and projects vertically upward from the support surface 18. The rotor 14 is secured to the underside of the blades 16 and is further attached to the hub 28 by a pair of auxiliary blades 32 that extend radially outward from the hub 28 at a position circumferentially intermediate the blades 16. Blades 16 are propelled for rotation by jet engines 34, or other propulsion means, which are mounted at the outer ends of the blades 16 in an orientation which produces thrust in a direction substantially perpendicular to the radial axis of the blades 16.

Hub 28 and support shaft 30 are configured to form a rotatable coupling which supplies fuel from a fuel inlet pipe 36 that is routed through the interior of the support shaft 30 to fuel lines 38 which extend outwardly through the interior of the blades 16 to interconnect with the jet engines 34. This rotatable coupling comprises a circumferential groove 44 in the support shaft 30, with multiple outlets that are in fluid communication with the fuel inlet line 36 being disposed about the circumference of the groove 44. Hub 28 has multiple circumferentially arranged collecting inlets adjacent the groove 44 so that, during rotation, fuel is delivered from the groove outlets into the hub inlets and is thereby directed into the two blade fuel lines 38. Similarly, vaporizable liquid is supplied from a liquid supply line 50 through a second rotary coupling into fluid lins 52 that are routed through the interior of the blades 16 to supply such liquid to thrust enhancement apparatus which is described in more detail hereinafter.

The hub 28 and the support shaft 30 are also adapted to supply direct current electrical energy from a stationary voltage source 54, mounted within the support shaft 30, to the rotating blades 16. The rotatable contact means for supplying such direct current includes a contact ring 56 embedded in an insulated groove 58 that extends circumferentially about the support shaft 30. Current is collected by brushes 60 attached to each blade 16 which continuously contact ring 56 as the blades 16 rotate. The current from external source 54 is utilized to magnetize the field poles (i.e., supply energization current). Secondarily, the current provides electrical power to the jet engines 34 during engine startup and also powers the blade attitude control means described below.

Figure 3:
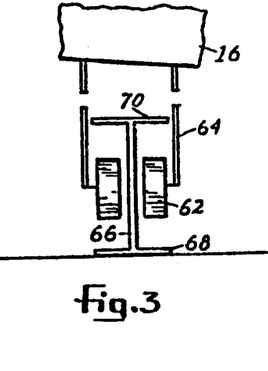
FIG. 3 is an enlarged view of a wheel and track arrangement for supporting the blades of a generator constructed in accordance with this invention and for defining upper and lower attitude limits of the rotating blades of the invention.

Blades 16 are supported at rest position by roller means generally including a pair of wheels 62 mounted at the lower terminus of wheel support legs 64 which extend vertically downward from either side of each blade 16 at a position between the stator 12 and the outer terminus of the blades 16. During blade rotation, wheels 62 will move within the confines of a circular of annular track 66 having the I-beam cross-sectional configuration that is depicted in FIG. 3. In particular, lower track support surface 68 confines the wheels 62 in a lower position, such as when the blades 16 are at rest position. The upper surface 70 of the annular track 66 defines an upper limit position of the attitude of the blades 16 in that, should the blades 16 lift sufficiently during rotation, the wheels 62 bear against the surface 70 and prevent further upward movement of the blades 16.

To maintain or control the vertical position of the blades between the upper and lower limit positions defined by the track 66 and wheels 62, each blade 16 is provided with an aileron 72 and control means for actuating the ailerons 72 to control the attitude or elevation of the blades 16 during rotation. The ailerons 72 are configured in the same manner as ailerons of conventional fixed wing aircraft and function to vary the lift characteristic of the baldes 16. Control means for the ailerons, which may be a conventional attitude sensing device 74, is responsive to angular motion of the blades 16 relative to the horizontal plane. In particular, blade variation about the horizontal plane causes the control device 74 to activate a control motor 76 that is operably coupled to the aileron 72 to vary the position of the aileron 72 and correct the blade lift angle.

Figure 4:
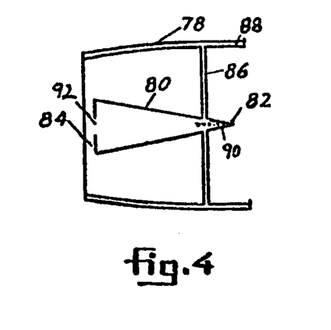
FIG. 4 is an enlarged diagrammatic sectional view of the exhaust end of a jet engine for propelling the blades of the electrical generator depicted in FIG. 1, such sectional view being taken along the line 4—4 of FIG. 1.

As previously described, the propulsion means for rotating the blades 16 are preferably jet engines 34 mounted at the end of each blade 16, with the engines 34 receiving fuel via fuel lines 38. To further improve the efficiency of the jet engines 34, each of the engines can be equipped with thrust enhancement means having provision for flash vaporizing a liquid that is introduced therein. As is depicted in FIG. 4, such thrust enhancement means include a conical chamber 80 that is mounted within the engine and adjacent the exhaust end thereof. As is shown in FIG. 4, the chamber 80 includes a closed pointed end 82 that faces the intake end of the engine 34 and a partially closed end face 84 facing the direction of the engine exhaust.

The conical chamber 80 is supported within the interior of the engine 34 by four circumferentially spaced apart tubes 86 that extend between the wall of the chamber 80 and the engine shell 88. These tubes provide a passageway for liquid to flow from the fluid line 52, through the engine shell 88 to the conical chamber 80. The liquid fed into the conical chamber 80 is volatilized by the intense heat to which the chamber 80 is subjected in the exhaust path of the engine 34. To further increase the vaporization of liquid within chambers 80, each chamber can be provided with a heating coil 90 located within the interior of the chamber 80 adjacent to the closed end 82. This coil is energized by current from the brushes 60. Gases produced within the chamber 80 are expelled through the central opening 92 in the end face 84 such that the gases exiting the chamber 80 flow substantially in the same direction as the thrust-producing airstream supplied by the engine 34.

Describing now the operation of the above jet engine generator, the jet engines 34 produce a thrust to propel blades 16 in rapid rotation about the shaft 30. As the rotor field poles 22 rotate past the stator coils 20, alternating current electrical energy is induced in the stator coils 20 and collected at an output terminal for distribution by a conventional power distribution system.

The electrical output of the generator 10 can be varied within a wide range of power output by varying the rotational speed of the blades 16 and performing an appropriate frequency alternation on the stator output to produce a sixty cycle per second output or virtually any other desired signal frequency. It can be appreciated that these power variations can be produced with the generator operating at substantially the same efficiency by contro'ling the jet engine thrust to establish the rotational speed of the rotor field poles 22 relative to the stator coils 20.

During rotation there is normally sufficient upward lift on the blades 16 to raise the blades from the lower limit position in which the wheels 62 bear against the lower surface 68 of the annular track 66. Such lift is desirable in that it reduces friction between hub 28 and shaft 30 and eliminates friction between wheels 62 and track 66. During operation of the generator 10 at various rotational speeds, ailerons 72 and their associated control means serve to control the attitude or elevation of the blades 16 so that the wheels 62 do not bear against either lower surface 68 or upper surface 70 of the track 66. In this respect, the track upper surface 70 limits the blade lift to a predetermined upper position in the event that the ailerons 72 fail to effectively control blade lift.

Figure 5:
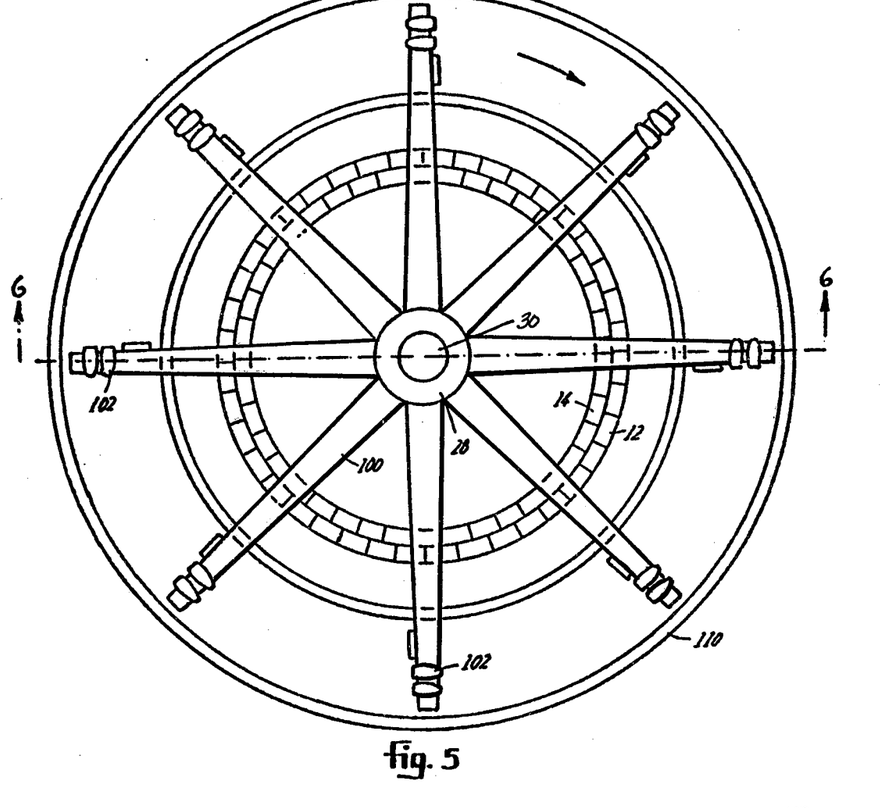
FIG. 5 is a diagrammatic plan view of an alternate embodiment of the invention.
Figure 6:
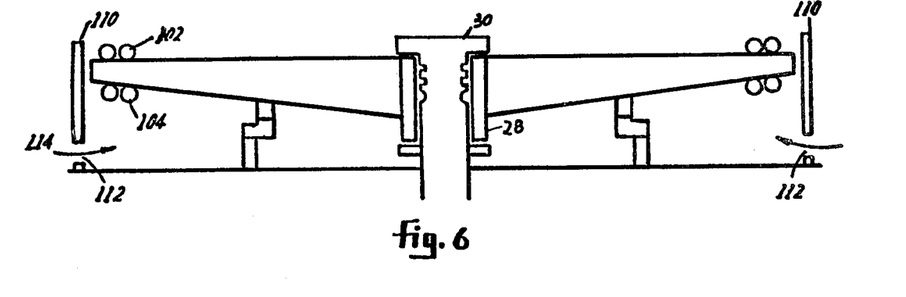
FIG. 6 is a cross-sectional view of the alternate embodiment of FIG. 5, taken along line 6—6 of FIG. 5.

An alternate embodiment of the invention is shown diagrammatically in FIGS. 5 and 6. This embodiment, through illustrated in simple form, includes all the features of the above-described generator 10, modified as follows.

The generator of FIGS. 5 and 6 includes eight radially extending blades 100 having two upper and two lower jet engines 102 and 104 mounted near the end of each blade 100. Each engine 102 and 104 preferably includes thrust enhancers of the type described above. In an embodiment of the invention such as that depicted in FIGS. 5 and 6 wherein a relatively large number of jet engines are employed, the thrust enhancers are preferably operated by an onboard computer system (not shown) which first signals the electrical heating of coils 90, and, when the coils have been heated to the proper temperature, triggers the delivery of fluid into the thrust enhancer chamber and controls the fluid flow to maximize the efficiency of the thrust enhancers. Preferably, the four thrust enhancers associated with the engines 102 and 104 of each blade 100 are sequentially operated by such onboard computer.

The embodiment of FIGS. 5 and 6 further includes an outer wall 110 which projects vertically upward from support surface 18 to coaxially surround the path followed by the outer termini of the blades 100 to control tornado cycloning during high speed generator operation. The outer wall 110 includes a series of vents 112 that are spaced apart from one another along the lower portion of the wall 110. The vents 112 include shutters or other means for controlling the volume and velocity of the air which passes through the vents 112 (indicated by arrows 114 of FIG. 6) to supply adequate intake air for the engines 102 and 104.

Figure 7:
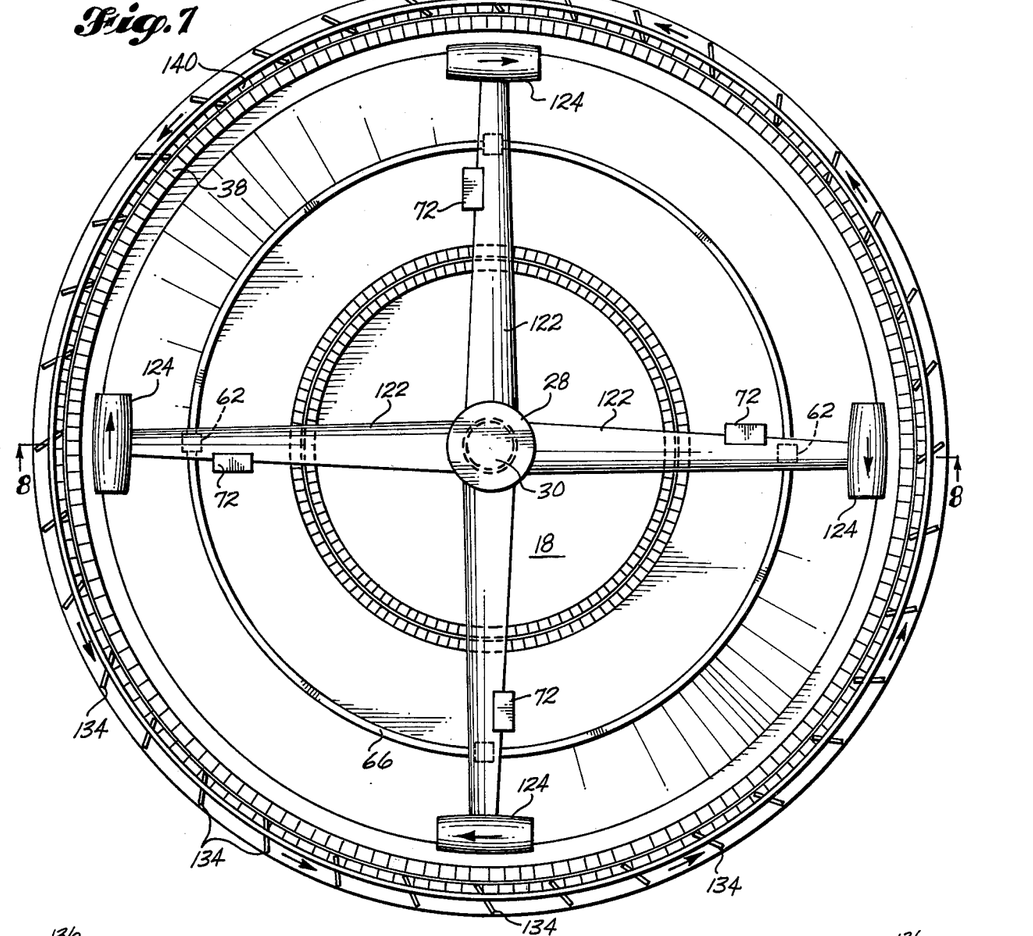
FIG. 7 is a diagrammatic plan view of another alternate embodiment of this invention which includes a second electrical generator.
Figure 8:
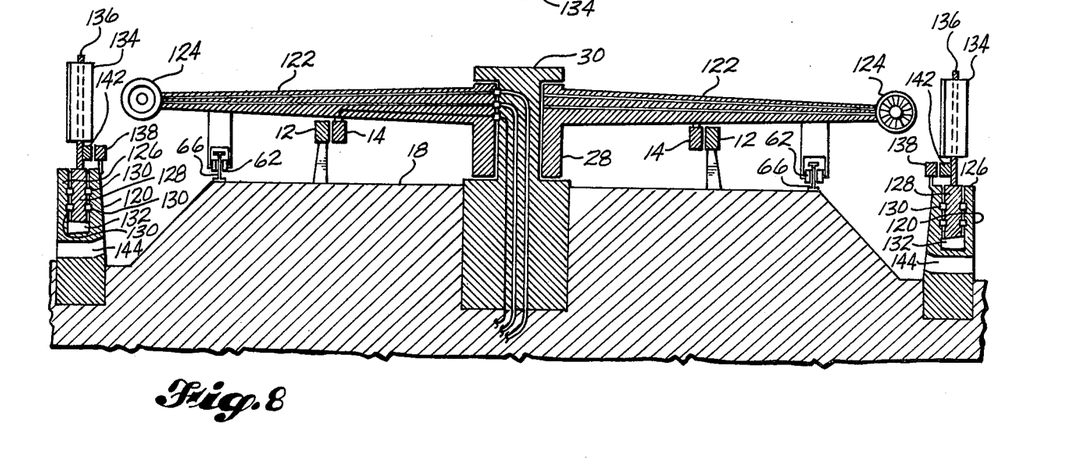
FIG. 8 is a cross-sectional view of the alternate embodiment of FIG. 7 taken along the line 8—8 of FIG. 7.
Figure 9:
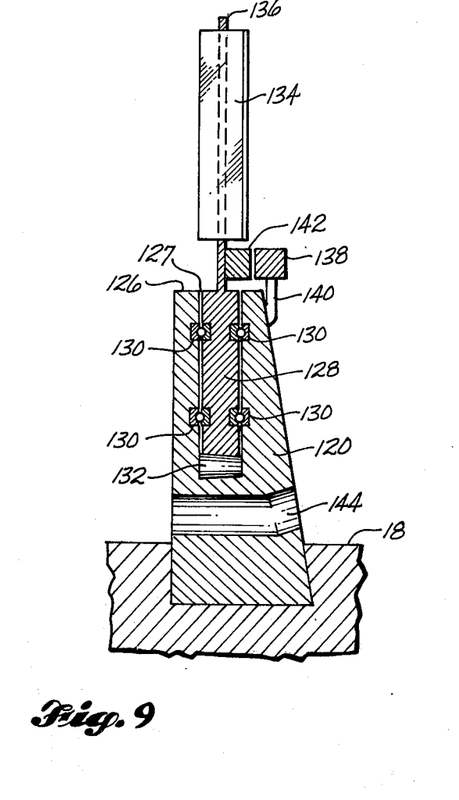
FIG. 9 is an enlarged cross sectional view of rotor and stator assembly of the embodiment depicted in FIG. 8.

In the alternate embodiment depicted in FIGS. 7, 8 and 9, the outer wall 110 of FIGS. 5 and 6 is replaced by structure which forms a second electrical generator to thereby increase the amount of electrical energy produced by the invention. In particular, the embodiment of FIGS. 7 and 8 includes an upwardly projecting annular foundation wall 120 which coaxially surrounds an electrical generator of the above-described type having four blades 122 that are orthogonal to one another and project radially outward from the rotatable hub 28 and shaft 30. A jet engine 124 is mounted near the outer terminus of each blade 122 to propel the blades 122 in the above-described manner. As in the previously described embodiments, a first electrical generator is formed by an annular rotor 14 that rotates with the blades 102 and a stationary stator 12 that circumferentially surrounds the rotor 14. Further, as previously described, ailerons 72 are utilized to maintain a blade attitude during operation of the electrical generator so that the wheels 62 do not contact either the upper or lower surfaces of the annular track 66. In the embodiment of FIGS. 7 and 8, the upper face 126 of foundation wall 120 includes a downwardly extending recess or annular groove 127 which contains a rotatable ring member 128. Bearings 130 spaced apart along the side walls of the ring member 128 and bearings 132 located between the lower terminus of the ring member 128 and the lower terminus of the groove 126 permit the ring member 128 to slide freely within the groove 126. A plurality of substantially rectangular wind vanes 134 extend vertically upward from the upper surface of the ring member 128 on support rods 136 which are circumferentially spaced apart around the upper face of the ring member 128. The planar surfaces of the wind vanes 134 are oriented for impingement of the airflow created by operation of the jet engines 124 and rotation of the blades 122. Further, the planar surfaces of wind vanes 134 can be either relatively flat or can be contoured, as necessary, to provide maximum force on the wind vanes.

To supply electrical energy, the second electrical generator includes an annular stator 138, mounted along the upper edge of the foundation wall 120 by a plurality of circumferentially spaced apart mounting brackets 140 that position the stator 138 slightly above the upper face 126 of the foundation wall 120. An annular rotor 142 is mounted to the wind vane support rods 136 or the upper surface of the ring member 128 so that the interface of the annular rotor 142 is in spaced apart juxtaposition with the outer face of the stator 138. Stator 138 and rotor 142 are constructed in the same manner as stator 12 and rotor 14 of the previously described embodiments of FIGS. 1 through 6, each having a plurality of conventionally wound coils that form the field poles of the rotor and the coils of the stator. As in the case of the embodiments depicted in FIGS. 1 through 6, direct current electrical energy is supplied to the rotor 142 from a voltage source mounted within the ring member 128 or, in a manner similar to that depicted in FIG. 1, can be supplied from a source external to the ring member 128 via a slip ring and brush arrangement within the annular groove 126.

To provide adequate air for the engines 124, the foundation wall 120 includes a series of air inlet ducts 144 that are circumferentially spaced apart along the lower portion of the wall 120. If desired or necessary the air inlet ducts 144 can include shutters or other control means which permit control over the amount of air passing inwardly to the jet engines 124 and blades 122.

In operation, the jet engines 124 cause the blades 122 to rotate about the shaft 30 so that alternating current is induced in the stator 12 in the manner previously described herein. At the same time, the jet engine exhaust effluent and airflow passing from the blades 122 impinge on or strike the upwardly extending wind vanes 134 causing the ring member 128 to rotate within the annular groove 126 in a direction opposite to the rotational direction of the blades 122. As the ring member 128 rotates and moves the rotor 142 about the stationary stator 138, alternating electrical current is induced in the stator windings which are connected to an output terminal and a conventional power distribution system. As in the case of the electrical generator comprising stator 12 and rotor 14, the frequency of the generated electrical electrical energy is determined by the number of field poles and stator windings along with the rotational speed of the rotor. Thus, in situations where a particular frequency is desired (i.e., conventional sixty cycle electrical energy), the power distribution system can include conventional apparatus for frequency alteration or the foundation wall 120 and the ring member 128 can be adapted for rotation at a constant speed.

From the foregoing, the power saving features of the present invention can be appreciated. First, by locating the jet engines far outboard of the rotational axis of the generator, the leverage of the blades is maximized. Secondly, by imparting a lift to the blades, the frictional resistance between hub 28 and the support shaft 30 is minimized. Further, by use of thrust enhancers in each jet engine, the efficiency of the engines is increased. Finally, by use of the second electrical generator described relative to the embodiments of the invention depicted in FIGS. 7 and 8, the force of the air flowing from the jet engines and the blades is utilized to generate additional electrical energy, thereby increasing the overall efficiency of the invention.

While particular embodiments of this invention have been illustrated and described, it will be appreciated by those skilled in the art that there are many modifications which can be made which will not depart from the spirit of this invention nor from the scope of the hereinafter set forth claims.

The embodiments of the invention in which an exclusive property or privilege is claimed are defined as follows:

1. An electrical generator comprising:
   a rotatable hub;
   blades attached to and extending radially outward from said hub, each of said blades including an aileron mounted thereto;
   propulsion means attached to said blades for producing thrust in a direction substantially perpendicular to the radial axis of said blades so that said blades rotate about an axis of revolution extending through said rotatable hub;
   control means for actuating said ailerons to control the attitude and lift of said blades during rotation thereof;
   rotatable coupling means mounted within the interior of said hub for supplying fuel to said propulsion means;
   a generator rotor operatively connected to said hub for rotation therewith, said generator rotor being substantially annular in geometry and being coaxial to said rotatable hub; and
   an annular fixed position generator stator mounted in coaxial spaced apart juxtaposition with said rotor, whereby rotation of said rotor produces electrical current in said stator.

2. The generator of claim 1 further comprising roller means attached to said blades for supporting said blades at a lower limit position when said blades are rotated at leas than a predetermined rotational speed.

3. The generator of claim 2 further comprising an annular track having a lower support surface below said roller means and an upper support surface located above said roller means, said roller means bearing against said lower support surface when said blades are at said lower limit position, said roller means bearing against said upper surface of said annular track to define a second limit position when rotation of said blades causes said blades to lift to a higher elevation.

4. The generator of claim 1 further comprising rotatable contact means for supplying direct current electrical energy to said rotor.

5. The generator of claim 1 wherein said propulsion means comprise a jet engine.

6. The generator of claim 1 wherein said propulsion means comprises a jet engine having thrust enhancement means including a chamber positioned within the interior of said engine and heated by the exhaust effluent of said engine, said chamber having an open end directed toward the rear of said engine, and said thrust enhancement means including supply means for supplying a liquid to said chamber wherein said liquid is volatilized and expelled as a thrust enhancing gas that flows substantially in the same direction as the exhaust of said engine.

7. The generator of claim 6 wherein said chamber is conical in geometry and is mounted adjacent the exhaust opening of said engine, said conical chamber having its closed pointed end facing the intake end of said engine, said conical chamber having a partially closed end face which includes a central opening facing in the direction of engine exhaust.

8. The generator of claim 6 further comprising a selectively heatable coil within said chamber to further volatilize said liquid that is supplied to said chamber.

9. An electrical generator comprising:
   a rotable hub;
   blades attached to and extending radially outward from said hub;
   propulsion means attached to said blades for producing thrust in a direction substantially perpendicular to the radial axis of said blades so that said blades rotate about an axis of revolution extending through said rotatable hub;
   rotatable coupling means mounted within the interior of said hub for supplying fuel to said propulsion means;
   a generator rotor operatively connected to said hub for rotation therewith, said generator rotor being substantially annular in geometry and being coaxial to said rotatable hub;
   an annular fixed position generator stator mounted in coaxial spaced apart juxtaposition with said rotor, whereby rotation of said rotor produces electrical current in said stator;
   an upwardly extending annular foundation wall coaxially surrounding said hub and positioned outwardly of the outer end of said blades, said foundation wall including a groove in the upper surface thereof;
   a ring member slidably contained within said groove of said foundation wall for rotation therein;
   a plurality of upwardly extending wind vanes circumferentially spaced apart about the upper surface of said ring member, each of said wind vanes being oriented and configured for receiving airflow caused by operation of said propulsion means and air flowing from said blades during rotation thereof so that said ring member rotates within said groove in a direction opposite to the rotational direction of said blades;
   a second generator rotor of annular geometry, said second generator rotor affixed for rotation with said wind vanes and said ring member with said second rotor being coaxially positioned relative to said rotatable hub; and
   a second fixed position generator stator of annular geometry, said second generator stator being coaxial to said second generator rotor with one face of said second generator rotor being in spaced apart juxtaposition with one face of said second generator stator so that said second generator rotor induces an alternating electrical current in said second generator stator as said ring member and said wind vanes are rotated.

10. The generator of claim 9 further comprising air inlet means circumferentially spaced apart around the circumference of said foundation wall for supplying airflow to said propulsion means.

11. The generator of claim 9 wherein said propulsion means comprises one or more jet engines mounted to said blades and wherein said jet engines include thrust enhancement means having a chamber positioned within the high temperature exhaust of said engine and supply means for supplying a liquid to the interior region of said chamber, said chamber having an open end facing toward the rear of said engine for outflow of gases formed by volatilization of said liquid within said chamber.

12. The generator of claim 9 further comprising attitude control means for maintaining the attitude of said blades between an upper and lower limit position, said attitude control means including at least one aileron mounted to each of said blades for varying the lift produced as said blades are rotated, wheel means mounted to project vertically from said blades, track means coaxially surrounding said rotatable hub at a position intermediate said rotatable hub and said outer wall, said track means including an upper bearing surface for said wheel means to define said upper limit position and a lower bearing surface for said wheel means to define said lower limit position, said attitude control means further including aileron control means operatively coupled to said ailerons to position each of said ailerons for maintaining said blades between said upper and lower limit positions.

* * * * *

UNITED STATES PATENT AND TRADEMARK OFFICE
CERTIFICATE OF CORRECTION

PATENT NO. : 4,208,590
DATED : June 17, 1980
INVENTOR(S) : Cecil R. Blomquist et al.

It is certified that error appears in the above-identified patent and that said Letters Patent are hereby corrected as shown below:

Column 3, line 28: "lins" is changed to --lines--.
Column 3, line 53: "of", after "circular", is changed to --or--.
Column 4, line 5: "baldes" is changed to --blades--.
Column 5, line 10: "through" is changed to --though--.
Column 6, line 58: one "electrical" is deleted.
Column 7, line 48: "leas" is changed to --less--.

Signed and Sealed this

Eighteenth Day of November 1980

[SEAL]

Attest:

SIDNEY A. DIAMOND

Attesting Officer

Commissioner of Patents and Trademarks